Oct. 22, 1940.    R. ROOSEN ET AL    2,219,081
INDIVIDUAL AXLE DRIVE FOR RAIL VEHICLES
Filed Feb. 11, 1938    4 Sheets-Sheet 1

Inventors
Richard Roosen
Ulrich Barske
Heinrich Carl
by S. Sokal

Oct. 22, 1940.    R. ROOSEN ET AL    2,219,081
INDIVIDUAL AXLE DRIVE FOR RAIL VEHICLES
Filed Feb. 11, 1938    4 Sheets-Sheet 2

Oct. 22, 1940.    R. ROOSEN ET AL    2,219,081
INDIVIDUAL AXLE DRIVE FOR RAIL VEHICLES
Filed Feb. 11, 1938    4 Sheets-Sheet 3

Inventors
Richard Roosen
Ulrich Barske
Heinrich Cartl
by S. Sonal
Attorney.

Oct. 22, 1940.                R. ROOSEN ET AL                2,219,081
                    INDIVIDUAL AXLE DRIVE FOR RAIL VEHICLES
                   Filed Feb. 11, 1938            4 Sheets-Sheet 4
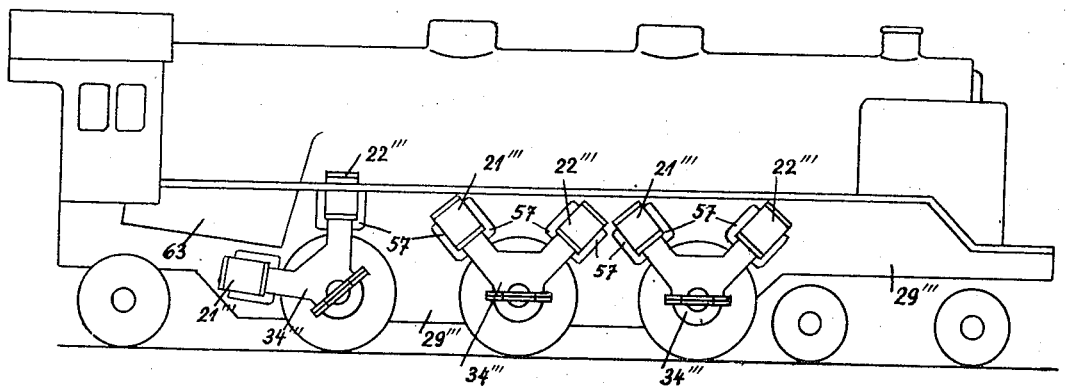
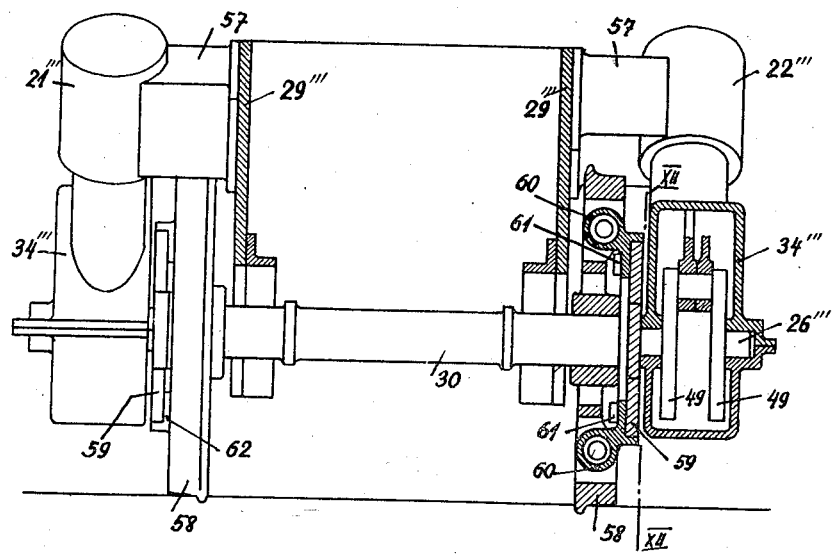
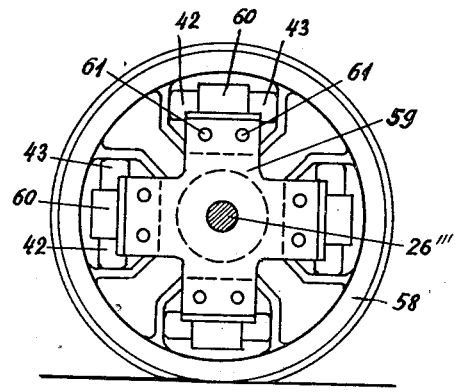
Inventors
Richard Roosen
Ulrich Barske
Heinrich Carl
by S. Sokal,
Attorney.

Patented Oct. 22, 1940

2,219,081

UNITED STATES PATENT OFFICE 2,219,081

INDIVIDUAL AXLE DRIVE FOR RAIL VEHICLES

Richard Roosen, Ulrich Barske, and Heinrich Carl, Kassel, Germany, assignors to Henschel & Sohn, Gesellschaft mit Beschränkter Haftung, Kassel, Germany Application February 11, 1938, Serial No. 189,986
In Germany February 23, 1937

3 Claims. (Cl. 105—37)

Applications have been filed in Germany on February 23, 1937, June 1, 1937, June 11, 1937, and October 4, 1937.

The present invention relates to steam engine driven railway vehicles such as locomotives or motor coaches and has for its object to provide an improved individual axle drive.

Owing to the increase of the speed of steam engine operated rail vehicles beyond 100 kilometres per hour, various suggestions have already been made for individually driving the axles of such vehicles with a view to obtaining smooth running and avoiding any undue wear of the permanent way. In accordance with these known suggestions so-called series machines are employed in which two or more cylinders are located side by side in a plane passing through the centre of the crank shaft. By using in these arrangements four or six or more cylinders per axle, it is possible to obtain a satisfactory balance of the reciprocating masses. These arrangements, however, have the disadvantage that they comprise a considerable number of parts and have a low thermo-technical efficiency.

It has also been suggested to use only two cylinders per axle and such arrangements, whilst having the advantage of a much simpler construction, have the disadvantage of the very considerable unbalanced masses. These unbalanced masses do not greatly affect the permanent way provided that the engines are fixed in a frame having spring suspension with regard to the axles, but they act directly upon the frame and detrimentally affect the smooth running of the vehicle.

As compared with these known suggestions, the invention provides a construction in which a comparatively small number of cylinders is used and a very satisfactory balance of reciprocating masses is attained.

An important feature of the improved construction consists in that two working cylinders rigidly mounted in the main frame which act upon one axle, are arranged one with regard to the other at an angle of about 90°, substantially in a plane at right angles to the permanent way, the connecting rods of such a pair of cylinders being connected to a common crank pin. The balancing of the masses of this arrangement of cylinders, is very perfect if the counterweight serving to balance the reciprocating masses is made exactly or approximately equal to the weight of the reciprocating masses of one cylinder, only two-thirds to three-fifths of the weight of the reciprocating rod being added to the weight of the reciprocating masses. With this selection of magnitude of the counterweight, tests and calculations show that there remain practically no free, that is, unbalanced mass forces, in the direction of a symmetry line drawn between the two cylinders, and that the still remaining free mass forces acting at right angles to this symmetry line, have a minimum value. The arrangement is preferably made so that the symmetry line is at right angles to the track, so that there are no free mass forces acting upon the latter. The detrimental action of the forces acting at right angles to the symmetry line may be still further reduced by increasing, according to the invention, the number of revolutions of the engine driving an individual axis either by the provision of a geared wheel transmission or by the employment of small wheel diameters, and consequently increasing the number of oscillations per second of forces causing recoiling movements and moments causing hunting. By the particular choice of the magnitude of the counterweight a further advantage is attained inasmuch as the number of oscillations of the free mass forces per second is twice as high as the number of revolutions of the engine driving the individual axle.

Owing to the combination of the above mentioned influences, disturbing movements of the vehicles are practically eliminated.

According to a further development of the invention two pairs of cylinders may be used per axle, but this arrangement should be used only if the power required per axle cannot for reasons of available space be provided by two cylinders only or if a particularly high uniformity of the driving moment is required, such uniformity being in the improved arrangements particularly easily attainable.

Various constructional embodiments of the invention are shown by way of example in the accompanying drawings, in which:

Fig. 1 is an elevation showing part of a locomotive provided with the first construction of the improved individual axle drive, Fig. 2 is a horizontal section drawn to a larger scale, through two adjacent axles and the corresponding drive, some parts being shown in view, Fig. 3 is a section on line III—III of Fig. 2, Fig. 4 shows in plan a modified construction of the connection of the two connecting rods of a V-steam engine, with a common crank pin, Fig. 5 is an elevation corresponding to Fig. 4.

Fig. 10 is an elevation of a locomotive showing a modification of the arrangement illustrated in Fig. 1.

Fig. 11 is a cross section through an axle of Fig. 10 drawn to a larger scale.

Fig. 12 is a section on line XII—XII of Fig. 11 showing a resilient coupling between a crank shaft and an axle.

Figure 2:
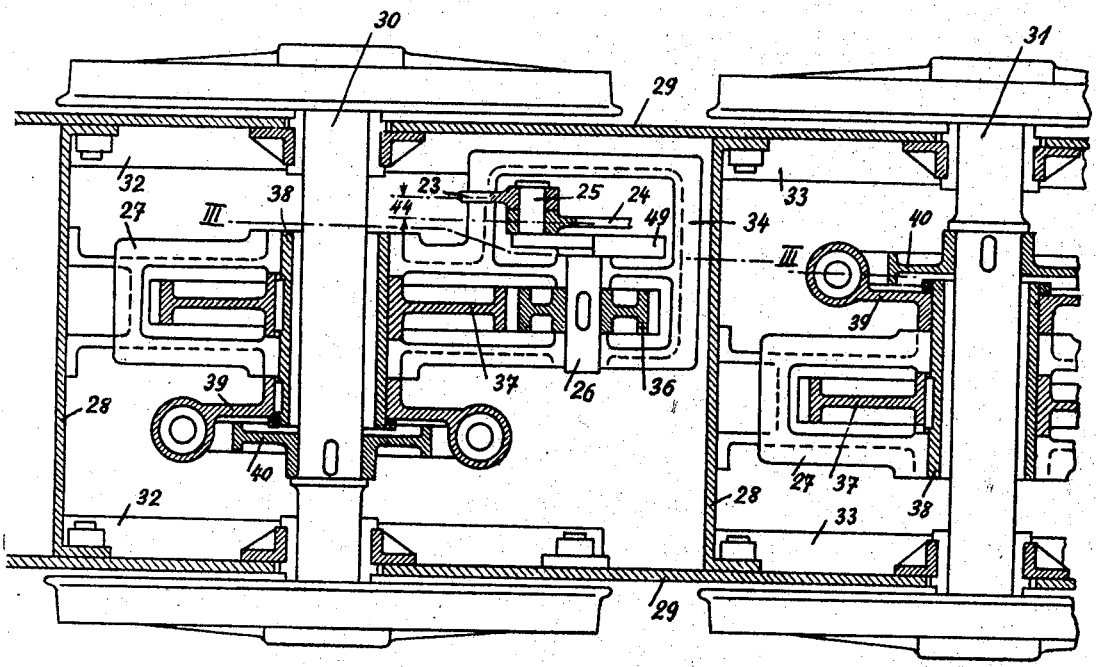
Figure 3:
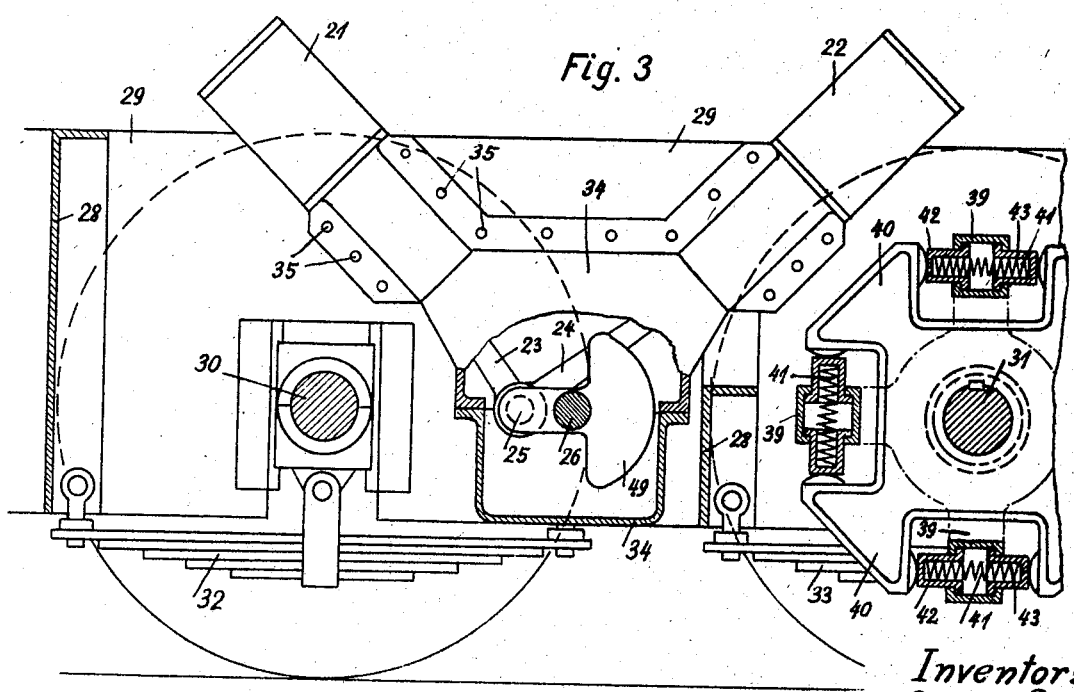

Referring first to Figs. 1 to 3, 21 and 22 indicate steam engine cylinders rigidly mounted in the main frame 29 and appertaining to the individual drive of an axle. These cylinders are located substantially in one plane, are inclined one with regard to the other by an angle of 90°, and have connecting rods 23, 24 acting upon a common crank pin 25 of a crank shaft 26. The crank shaft is mounted in a gear casing 27 which latter is fixed to transverse members 28 of the locomotive frame 29, said frame having as usual spring suspension with regard to the axles. The gear casing 27 is therefore also resiliently supported upon the axles. The spring suspension of the frame 29 with regard to the axles 30, 31 comprising springs 32, 33 is indicated in Fig. 3. The crank casing 34 may be integral with or rigidly fixed to the frame by means of bolts 35. In Fig. 2 the upper part of the crank casing and the gear casing are not shown. The crank shaft 26 carries fixed thereon a gear wheel 36 meshing with a larger gear wheel 37. The gear wheel 37 is fixedly mounted upon a hollow shaft 38 mounted in the casing 27, and drives by means of a resilient coupling of known kind the locomotive axle 30 or 31. The coupling is, by way of example, illustrated as a spring coupling, one half 39 of the coupling being mounted upon the hollow shaft 38 and the other half 40 upon the axle 30, or 31. The turning moment is transmitted from the part 39 to the part 40 in known manner by means of springs 41, each of the springs being mounted in two spring cups 42, 43. These spring cups bear at one end against the coupling half 40 and are at the other end slidably guided in tubular portions 39 of the coupling half 39.

Figure 4:
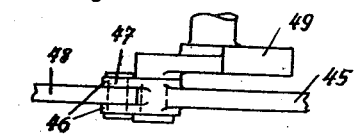
Figure 5:
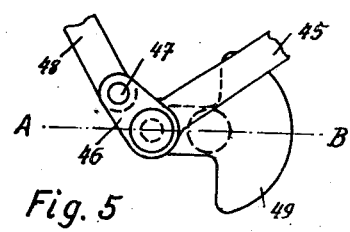

In order to reduce to a minimum the distance between the driven axles, the driving engines are staggered transversely, that is to say, one engine is arranged near one side, say the right hand side of the vehicle, and the next following nearer the other side, that is, the left hand side of the vehicle, and so on. In the construction according to Fig. 2 the connecting rods 23, 24 acting upon the common crank pin 25 are arranged side by side so that the centres of the two steam cylinders are displaced relatively to one another by the distance 44. This distance is very small, particularly if the heads of the connecting rods are provided with rolling friction bearings. Figs. 4 and 5 show a modified arrangement, known per se, in which the cylinders are located in the same plane. In this construction the head of the connecting rod 45 is formed with a forked extension 46 connected by means of a bolt 47 to the other connecting rod 48.

The counter-weight 49 always contains a portion for balancing the reciprocating masses, which, as previously stated is exactly or approximately equal to the reciprocating mass of one cylinder. The line A—B in Fig. 5 indicates the direction in which remaining or free mass forces act.

Figure 1:
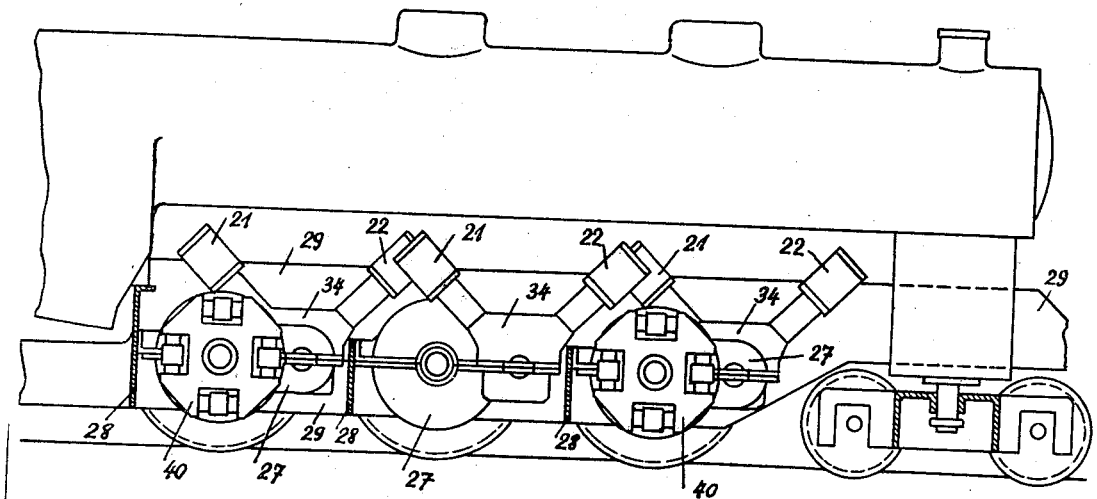
Figure 6:
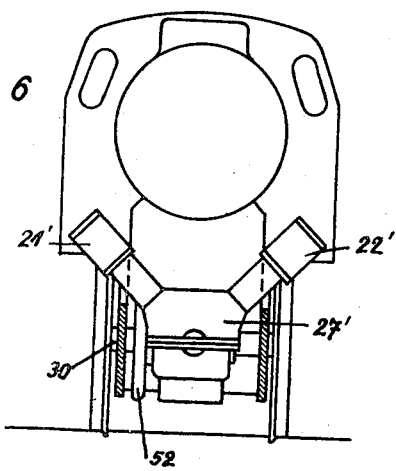
Fig. 6 is an end view partly in cross section, of a locomotive having transversely mounted V-steam engine.
Figure 7:
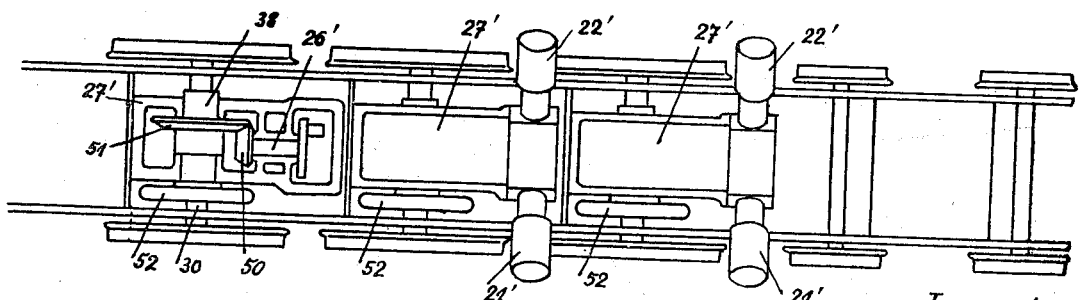
Fig. 7 shows in top view the frame of a locomotive having transversely mounted V-engines, as shown in Fig. 6.

In the construction according to Figs. 6 and 7, the driving engines are mounted transversely with regard to the longitudinal axis of the locomotive. This construction has the advantage of good accessibility of the cylinders 21', 22', and very easy dismounting of the pistons, see particularly Fig. 6. In Fig. 7, the tops of the gear casing and the engine are not shown in connection with the first axle. The crank shaft 26' drives, by means of a pair of bevel gears, 50 and 51, a hollow shaft 38 mounted in the casing 27', and the axle 30 is again driven from the hollow shaft by means of a resilient coupling 52.

Figure 8:
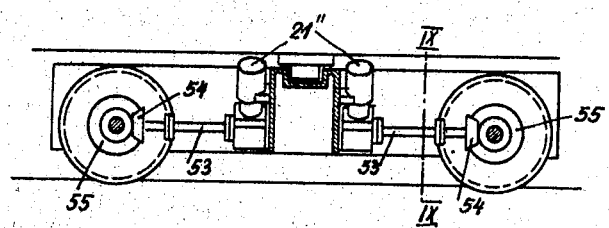
Fig. 8 is an elevation partly in section showing transversely mounted V-engines and transmission by bevel gear to the driven axles.
Figure 9:
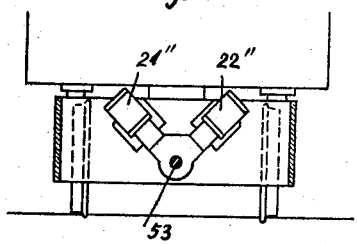
Fig. 9 is a section on line IX—IX of Fig. 8.

The construction diagrammatically indicated in Figs. 8 and 9 again comprises transversely mounted driving engines which drive the axles 56 by means of shafts 53 and pairs of bevel gears 54 and 55. This construction is particularly suitable for bogies of motor coaches.

In the construction according to Figs. 10, 11 and 12 the cylinders 21''', 22''', together with the crank casing 34''' are fixed to the outsides of the locomotive frame 29''' by means of cast on brackets 57 in such a manner that the crank shaft 26''' of each engine lies in the extension of the driven axle 30 in front of the corresponding wheel 58. Power transmission to the wheel is again effected by means of a resilient coupling (Fig. 12) of a similar kind to that shown in Fig. 3. One coupling half 59 is directly fixed upon the crank shaft 36''', whilst, as particularly shown in Fig. 12, the wheel 58 constitutes with its spokes the other coupling half. Between the two coupling halves 58 and 59 are again interposed spring-containing cups 42, 43 guided in tubular guideways 60, which latter are separately fixed to the coupling half 59 by means of bolts 61.

The construction according to Figs. 10 to 12 is very simple, inasmuch as the gear wheels and hollow shafts are entirely dispensed with. The engines are readily accessible and demountable. Moreover, each axle 30 with its wheels 58 can be easily dismounted in a downward direction, without the necessity of dismounting the driving engines. In order to provide for this dismounting of the axles, the coupling half 59 is, according to the invention, made at the face adjacent to the wheel 58, quite smooth, that is, without any projections, and is located at a distance 62 from the wheel. After loosening the bolts 61 and removing the guide members 60 with the spring cups 42, 43, the axle 30 together with the wheels 58 can be dismounted in a downward direction.

The construction according to Figs. 10 and 11 is particularly suitable for high powered locomotives, two V-engines being provided for each axle. With locomotives of smaller power requiring only one engine per axle, the engines may be staggered, that is arranged alternately on the right and on the left hand side of the vehicle.

As shown in Fig. 10 there is some difficulty in placing the engine nearest to the firebox 63, owing to the fact that the firebox projects to a considerable extent laterally from the locomotive.

This difficulty is, according to the invention avoided by placing the cylinder 22''' of the engine vertically and the other cylinder 21''' substantially horizontally. In this manner satisfactory accessibility of the engine and the firebox is maintained.

Figure 13:
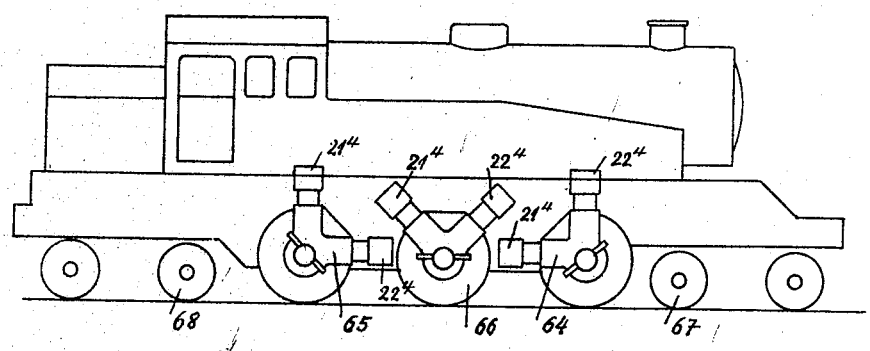
Fig. 13 is an elevation of a locomotive showing a modification of the arrangement of engines illustrated in Fig. 10.

Fig. 13 shows a modification of the construction according to Fig. 10, in which the wheel base is reduced to a minimum by a particular mounting of the driving engine. It will be seen that the cylinder 21⁴ of the engine 65 and the cylinder 22⁴ of the engine 64 are placed vertically, whilst the cylinder 22⁴ of the engine 65 and the cylinder 21⁴ of the engine 64 are placed horizontally, the engines 65 and 64 being the outer engines. The cylinders 21⁴ and 22⁴ of the engine 66 are inclined. The horizontal cylinders 21⁴ and 22⁴ of the outer engines are directed towards the middle engine 66, but they might in some cases be directed towards the wheels 67, 68 in order to reduce still further the length of the wheel bases.

It may be pointed out that in all the described constructions, it is possible to use two engines per driven axle. The use of two engines per driven axle has particular advantages in connection with this invention as regards the obtention of a very uniform turning moment, which is a very important feature whenever rapid starting or acceleration is required.

Figure 14:
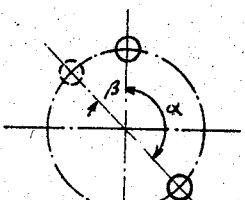
Fig. 14 shows the relative position of the cranks shown in Fig. 11.
Figure 15:
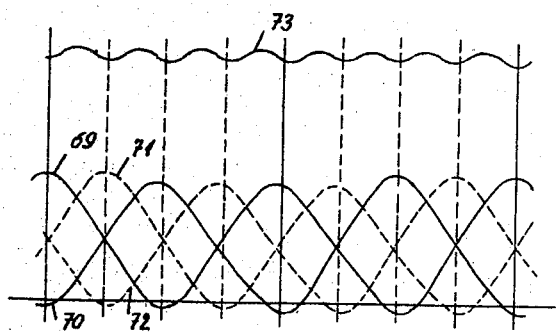
Fig. 15 is a diagram of turning moments corresponding to the arrangement of cranks shown in Fig. 14.

As each engine is very well balanced in itself, the phase difference or crank displacement of two engines acting upon the same axle can be so chosen that the gaps in the tractive power of one engine will be compensated by the peaks of tractive power of the other engine. This is best attained by arranging the cranks of the two pairs of cylinders at an angle α equal to about 135° or at an angle β equal to about 45° as shown in Fig. 14. Fig. 15 shows the corresponding diagrams of the turning moments. The curves 69, 70 appertain to one engine, whilst the curves 71 and 72 appertain to the other engine. The curve 73 which indicates the resultant turning moment, is almost a straight line, showing that the turning moment is practically constant. It will be seen that by using in accordance with the invention two V-engines having together 4 cylinders, the diagram of the turning moment is practically the same as hitherto obtained by means of an 8-cylinder engine.

We claim:

1. In a steam engine driven railway vehicle, an individual axle drive comprising in combination: a main vehicle frame; a plurality of axles carrying wheels; spring suspension means between said axles and said frame; a plurality of steam engines rigidly mounted in said frame for individually driving said axles; said engines each having two working cylinders inclined one to the other at an angle of about 90° and located substantially in a plane at right angles to the plane of the track; a driving connection between said engine and said individual axle comprising a crankshaft with a crank pin, the connecting rods of said two cylinders being associated with the crank pin of said crankshaft; a resilient coupling interposed between said crankshaft and said axle; said engines being fixed to the outside of the frame and said crankshafts being in line with said axles.

2. In a steam engine driven railway vehicle, an individual axle drive comprising in combination: a main vehicle frame; a plurality of axles carrying wheels; spring suspension means between said axles and said frame; a plurality of steam engines rigidly mounted in said frame for individually driving said axles; said engines each having two working cylinders inclined one to the other at an angle of about 90° and located substantially in a plane at right angles to the plane of the track; a driving connection between said engine and said individual axle comprising a crankshaft with a crank pin, the connecting rods of said two cylinders being associated with the crank pin of said crankshaft; a resilient coupling interposed between said crankshaft and said axle; said engines being rigidly fixed to the outside of the frame and said crankshafts being in line with said axles; said resilient coupling comprising two parts, the first part being mounted upon a wheel and the other half being mounted upon the corresponding crankshaft; said crankshaft terminating in a flange to which said second coupling half is fixed; said axle together with the wheels being downwardly removable from the frame on disconnecting said second coupling half from said flange.

3. In a steam engine driven railway vehicle, an individual axle drive comprising in combination: a main vehicle frame; three axles carrying wheels; spring suspension means between said axles and said frame; three steam engines rigidly mounted in said frame for individually driving said axles, each steam engine having two working cylinders inclined one to the other at an angle of about 90° and located substantially in a plane at right angles to the plane of the track, and a driving connection to its axle comprising a crankshaft with a crank pin, the connecting rods of said two cylinders being connected to the crank pin; and a resilient coupling interposed between said crankshaft and said axle, the cylinders of the engine corresponding to the middle axle being inclined to the track at about 45° and the cylinders of the engines corresponding to the outer axles being arranged one substantially at right angles to the track and the other substantially in a horizontal plane.

RICHARD ROOSEN.
ULRICH BARSKE.
HEINRICH CARL.